(No Model.)

M. C. CLARK.
APPARATUS FOR MANUFACTURING VULCANIZED RUBBER BELTING.

No. 348,659. Patented Sept. 7, 1886.

Witnesses:
J. Stait
Chas. H. Smith

Inventor:
Maurice C. Clark
per Lemuel W. Serrell
Atty

N. PETERS, Photo-Lithographer, Washington, D. C.

UNITED STATES PATENT OFFICE.

MAURICE C. CLARK, OF DERBY, ASSIGNOR TO THE BIRMINGHAM IRON FOUNDRY, OF BIRMINGHAM, CONNECTICUT.

APPARATUS FOR MANUFACTURING VULCANIZED RUBBER BELTING.

SPECIFICATION forming part of Letters Patent No. 348,659, dated September 7, 1886.

Application filed December 21, 1885. Serial No. 186,285. (No model.)

*To all whom it may concern:*

Be it known that I, MAURICE C. CLARK, of the town of Derby, in the county of New Haven and State of Connecticut, have invented an Improvement in Apparatus for Manufacturing Vulcanized Rubber Belting, of which the following is a specification.

Before my invention rubber belts had been subjected to a stretching operation previous to clamping the same between steam-heated tables or platens for curing or vulcanizing such belts, in order that the fabric upon which the rubber is placed may be held in a stretched or distended condition during the curing action; but the stretching operation required the attendant to exert considerable force, and more help was required, and the curing or vulcanizing operations were delayed in consequence of the time consumed in stretching the belts.

I make use of a curing or vulcanizing apparatus of ordinary construction; and my improvement relates to the combination, with the heated tables for curing the belts, of a clamping apparatus at one end and a clamping and stretching apparatus at the other end, acted upon by rams and cylinders into which water is pumped.

By using this improvement in connection with hydraulic presses for pressing the steam-heated tables upon the surfaces of the belt, the whole of the movements are effected by hydraulic power, and the attendant controls the movements of the respective parts by cocks and valves, instead of exerting manual force, as heretofore necessary.

Figure 1:
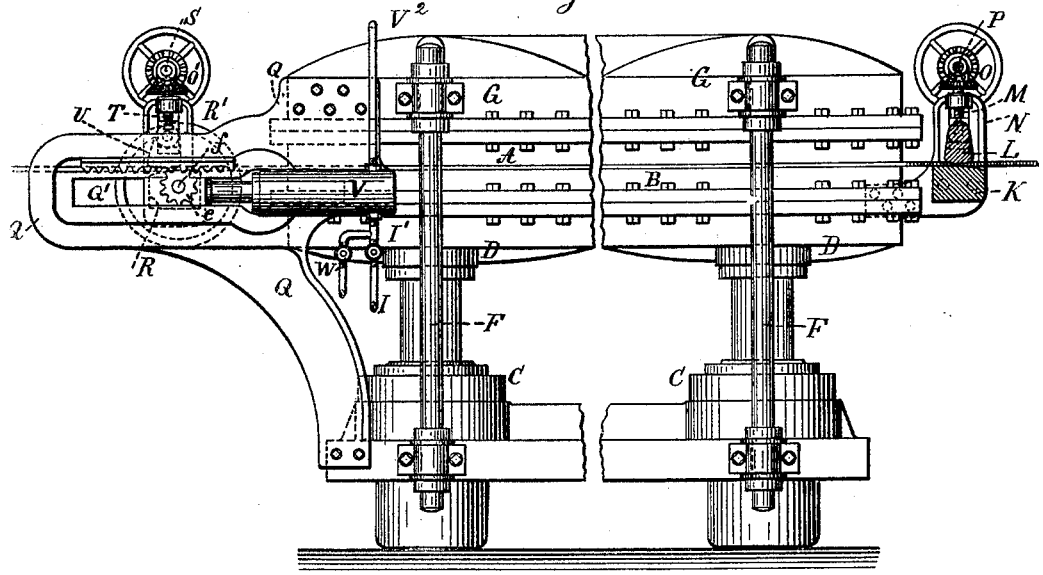
Figure 2:
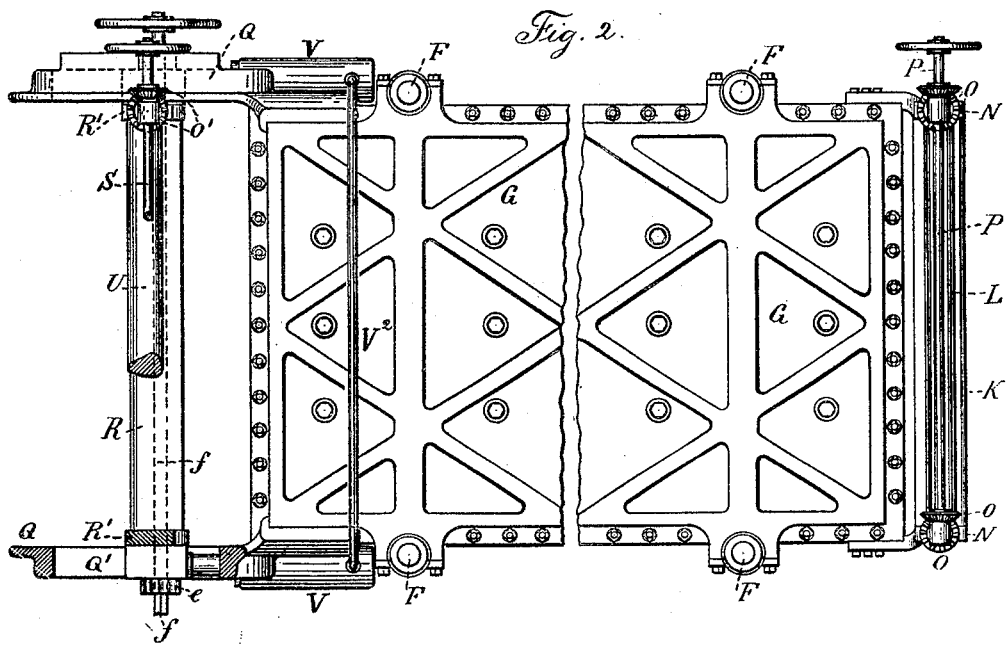

In the drawings, Figure 1 is an elevation, partially in section, of the two ends of a vulcanizing apparatus, showing my improvements for clamping and stretching the belts; and Fig. 2 is a plan view of the press, some parts being shown in section for more full illustration.

My improvements are especially available with hydraulic presses. These have heretofore been made for curing rubber belting and similar articles by subjecting the same to the action of steam heat while between the hollow platen A and hollow table B.

The table and platen may be of any desired length, and hydraulic presses are made use of to press the steam-table and belt against the hollow platen. I have shown two hydraulic cylinders, C C, with their rams and crossheads D, to act upon the steam-table, and the columns F and head-blocks G to support the hollow plate A. These parts may be of any desired size or construction, and one or more of such hydraulic presses may be employed, according to the length of the steam tables or platens.

At one end of the press I make use of a holding-clamp composed of a bed, K, and an eccentric clamping-bar, L, that is acted upon at its ends by screws M, passing through the end supporting-frames, N, and there are bevel gear-wheels O, that connect the screws to the cross-shaft P, by which the screws are simultaneously operated to open or close the clamps and release or hold the belt. The end frames that support this clamping apparatus may be attached to the steam table or platen B; or they may extend from the head-block or platen to the base-plate of the machine and be secured to the stationary parts. At the other end of the apparatus I provide frames Q, extending, by preference, from the bed of the machine to the head-block or platen, and such frames are slotted horizontally, as shown at Q', near the level of the top of the steam-table when it is raised for compressing and holding the belts while being vulcanized.

Within the slots or mortises Q' are the ends of cross-bar R, forming a movable clamping-bed, upon which are supported the end frames, R', having bearings for the cross-shaft S, and bevel-gearing O', by which the clamping-screws T are turned in one direction or the other. These screws pass through the frame R', and act upon the eccentric clamping-bar U, that is pivoted at its ends to the blocks, upon which the screws act, so that the rubber belt or belts passing between the clamping-bed R and the eccentric clamp U are held firmly by the action of the screws T, and the surface of the eccentric clamping-bar U being convex, the clamping action is increased by any movement of the clamping-bar due to the strain upon the belts.

Upon the frames Q, at each side of the machine, are the hydraulic cylinders V, that are provided with rams to act against the end portions of the clamping-bed R to slide the same forward within the slots Q' of the frame Q, and water or other liquid under pressure is supplied into the cylinders V by a pipe, I, and cock or valve I', and the water passes from one hydraulic cylinder to the other by the pipe V². It is now to be understood that whenever the water is turned on by the valve or cock I' the rams within the cylinders V are forced outwardly by the pressure of the water, and the connecting-pipe V² maintains uniformity of pressure and movement of the rams in the respective cylinders. These rams slide along the clamping-bed R and stretch the belt or belts that are to be vulcanized, and the power exerted will depend upon the pressure of water thrown into the cylinders by the ordinary hydraulic pump or accumulator. The rubber belt or belts between the steam-tables is to be stretched by the hydraulic cylinders and rams aforesaid immediately before the belts are clamped between the steam-heated table and platen. After the curing or vulcanizing operation is completed, or during such operation, the water or other liquid is allowed to run out of the hydraulic cylinders by opening the discharge-pipe W; and, if necessary, the pinions $e$ upon the cross-shaft $f$, that is supported by the clamping-bed R, may be made use of to move the clamping-bed toward the steam-table. These pinions gear into stationary racks upon the frames Q, and the shaft and pinions are turned by a crank or hand-wheel.

I claim as my invention—

1. The combination, with hollow steam tables and platen for clamping and vulcanizing rubber belts, of the clamps for holding the rubber belts at one end of the vulcanizing-table, and clamps at the other end for holding such belts and hydraulic cylinders, and rams for giving motions to the clamps and stretching the belts, substantially as set forth.

2. The frames Q, having slots Q', in combination with the clamping-bed R, the eccentric clamp, the hydraulic cylinders V, connected together by the pipe V², the rams to act upon the clamping-bed, and the pinions and racks for moving the clamps toward the vulcanizing-table, substantially as set forth.

Signed by me this 14th day of December, A. D. 1885.

MAURICE C. CLARK.

Witnesses:
WM. B. WOOSTER,
THOS. L. I. BULLUSS.